United States Patent [19]

Hirata et al.

[11] 4,340,907
[45] Jul. 20, 1982

[54] SPECIAL REPRODUCING SYSTEM IN AN APPARATUS FOR REPRODUCING VIDEO SIGNALS FROM A ROTARY RECORDING MEDIUM

[75] Inventors: Atsumi Hirata, Yamato; Kanji Kayanuma, Hadano, both of Japan

[73] Assignee: Victor Company of Japan, Ltd., Yokohama, Japan

[21] Appl. No.: 4,813

[22] Filed: Jan. 19, 1979

[30] Foreign Application Priority Data

Jan. 20, 1978 [JP] Japan .................................. 53-5020

[51] Int. Cl.³ .............................................. H04N 5/76
[52] U.S. Cl. .................................. 358/128.6; 360/10; 369/47
[58] Field of Search ................... 358/128, 128.5, 128.6; 179/100.3 V, 100.3 D, 100.1 G, 100.4 D, 100.4 R, 100.1 B; 360/10, 77

[56] References Cited

U.S. PATENT DOCUMENTS

| | | | |
|---|---|---|---|
| 3,854,015 | 12/1974 | Janssen | 358/128 |
| 3,911,211 | 10/1975 | Rennick | 179/100.3 V |
| 3,963,861 | 6/1976 | Crooks | 358/128 |
| 3,973,080 | 8/1976 | Pickopp et al. | 358/128 |
| 3,993,863 | 11/1976 | Leedom et al. | 360/10 |
| 4,152,727 | 5/1979 | Tatsuguchi et al. | 179/100.1 B |
| 4,160,268 | 7/1979 | Goto et al. | 179/100.3 V |
| 4,164,756 | 8/1979 | Toda et al. | 360/10 |

Primary Examiner—Raymond F. Cardillo, Jr.

[57] ABSTRACT

A special reproducing system is applied to apparatus for reproducing a video signal from a grooveless rotary recording medium. Video signals are recorded along a spiral track with a plural number of fields recorded on every revolution of the medium. The special reproducing system comprises a reproducing element for tracing the track of the rotary recording medium and picking up the recorded signal, a tracking control mechanism for operating in response to skip pulses applied thereto to cause the reproducing element to shift to an adjacent track turn of the spiral track thereby to undergo skipping, and a skip pulse generating circuit for generating skip pulses with timings corresponding to the vertical blanking period positions of the recorded video signal, the skip pulses being of a number corresponding to an operational mode for carrying out a special reproduction differing from normal reproduction at every rotational period of the rotary recording medium, and supplying the skip pulses to the tracking control mechanism. The reproducing element is caused by the tracking control mechanism responsive to the skip pulses to skip to an adjacent track turn within the vertical blanking period of the recorded video signal.

9 Claims, 18 Drawing Figures

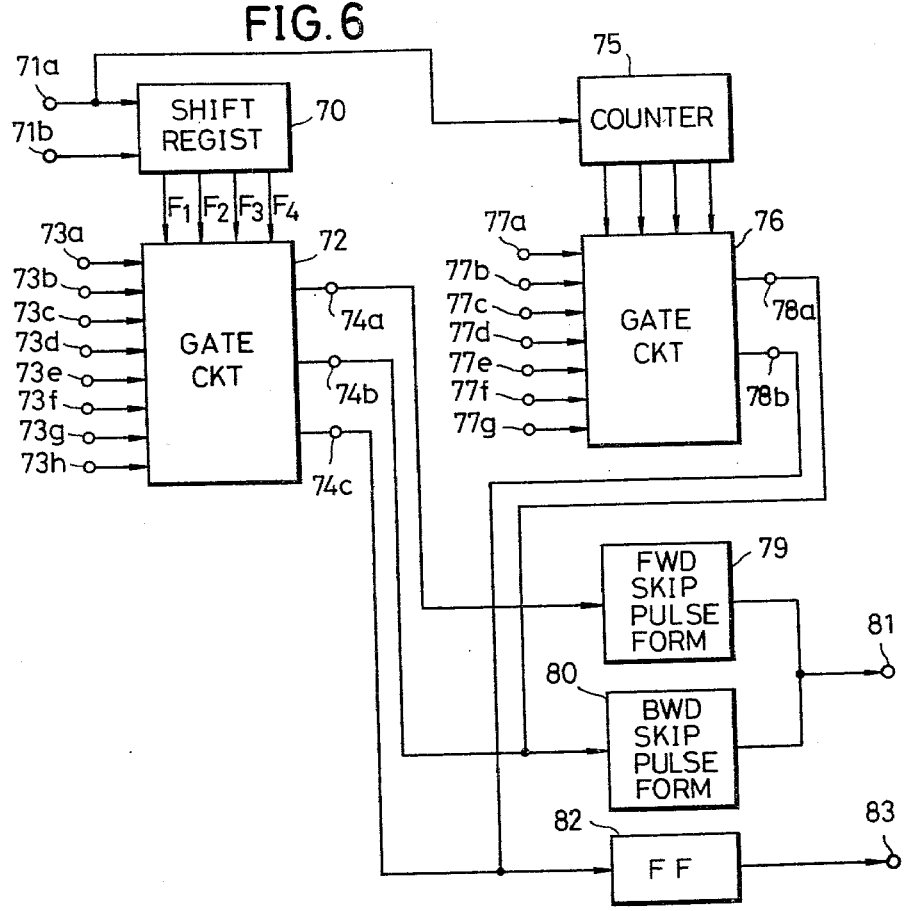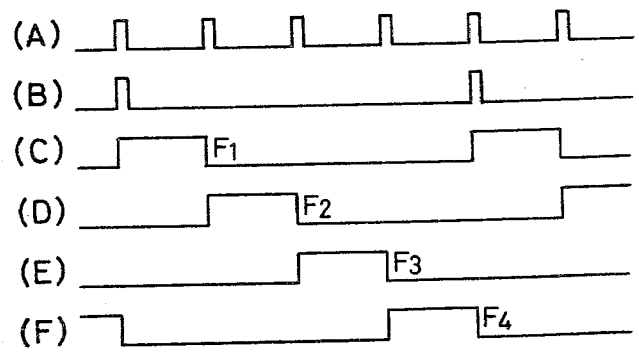

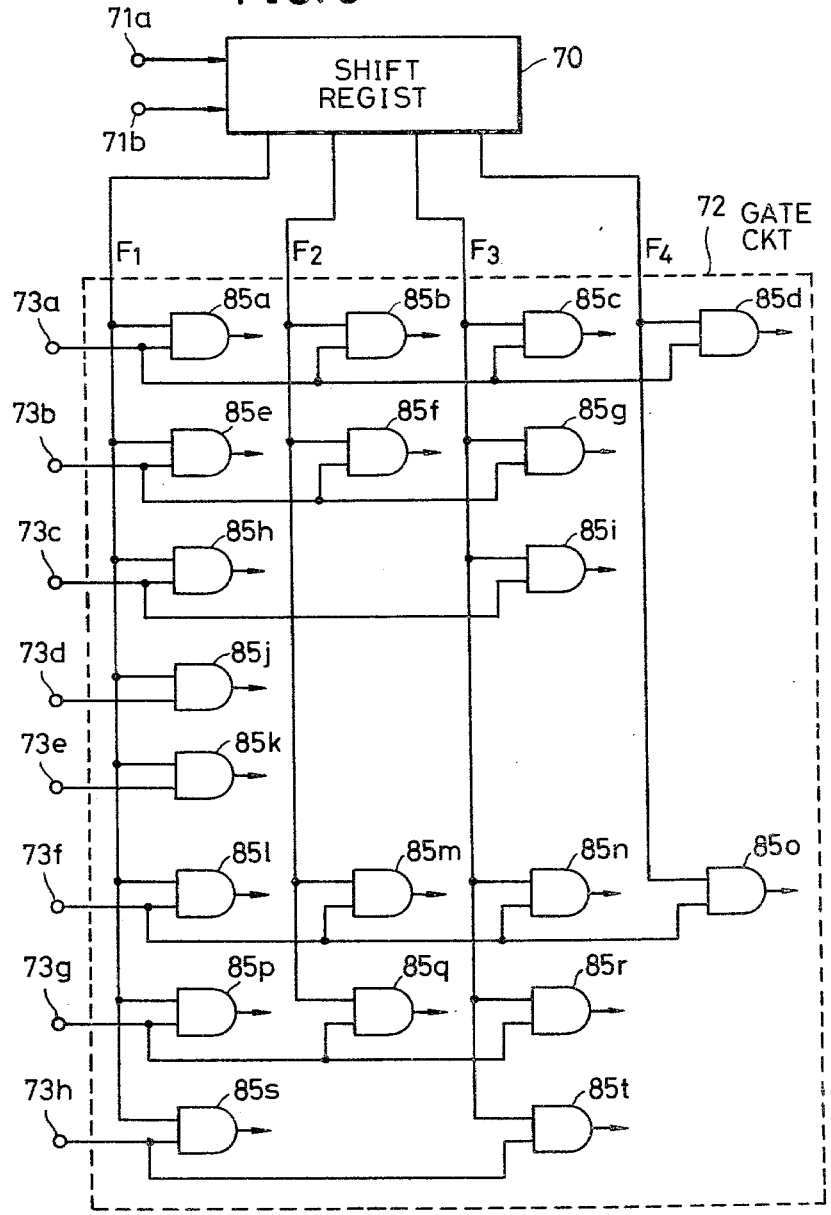

SPECIAL REPRODUCING SYSTEM IN AN APPARATUS FOR REPRODUCING VIDEO SIGNALS FROM A ROTARY RECORDING MEDIUM

BACKGROUND OF THE INVENTION

The present invention relates generally to special reproducing systems in apparatuses for reproducing rotary recording mediums and more particularly to a special reproducing system in an apparatus for reproducing by means of a reproducing transducer a video signal from a rotary recording medium on which the signal has been previously recorded along a spiral track, which system can shift the reproducing transducer to an adjacent track and accomplish a special reproduction wherein the reproduced picture becomes one of a motion differing to that of normal reproduction.

Known system for recording and reproducing information signals (such as video signals and/or audio signals) on and from disc-shaped, rotary mediums (referred to hereinafter simply as discs) are broadly divided into a system using optical reproduction, a system using a reproducing stylus employing a piezoelectric element, and a system utilizing variations in the elastrostatic capacitance between an electrode on the reproducing stylus and the recorded surface of the disc.

In accordance with a known electrostatic capacitance system, recording is accomplished by forming a spiral guide groove in the disc for guiding the reproducing stylus. At the same time, pits are formed in responsive correspondence with an information signal to be recorded on the bottom surface of the groove. In the reproducing system, the reproducing stylus is guided by the guide groove. The stylus traces the track within the groove and reproduces the signal in response to variations in the electrostatic capacitance.

In this known system, however, a reproducing stylus guiding groove is provided on the disc. The reproducing stylus is compulsorily guided by this guide groove. It is not possible for the reproducing stylus to undergo operations such as riding over the groove wall of one track, moving into another track and returning to the original track. If the reproducing stylus were to be forced to undergo such an operation, the groove and the stylus would be damaged. For this reason, it has not been possible in this known system to carry out special reproduction such as quick-motion picture reproduction, slow-motion picture reproduction, still-picture reproduction, and random access motion.

Accordingly, with the aim of overcoming the various problems of the known systems described above, a novel "Information signal recording and reproducing system" is disclosed in the specification of U.S. patent application Ser. No. 785,095, filed Apr. 6, 1977. According to this proposed system, the recording system forms pits in accordance with the information signal being recorded along a spiral track on a flat disc shaped recording medium, without forming a groove therein. In the reproducing system, a reproducing stylus traces over and along this track thereby to reproduce the recorded information signal in response to variations in the electrostatic capacitance.

In this system, since a groove for guiding the reproducing stylus is not provided on the disc, pilot or reference signals should be recorded on or in the vicinity of a track of the information signal, such as a video signal, on a rotary disc. At the time of reproducing, the reference signals are reproduced together with the video signal. Tracking servo control is carried out so that the reproducing stylus traces accurately along the track in response to the reproduced reference signals.

By the use of this previously proposed system, the recording track has no groove. There is no possibility whatsoever of the reproducing stylus or the recording medium being damaged. The stylus can trace the same portion of the track repeatedly many times, whereby a special reproduction such as still, slow motion, or quick motion reproduction becomes possible.

SUMMARY OF THE INVENTION

Accordingly, it is a general object of the present invention to provide a novel and useful system for special reproduction in a rotary recording medium reproducing apparatus which system is capable of carrying out special reproduction so as to obtain in an excellent manner reproduced pictures of motions differing from that of a normal picture.

Another and specific object of the invention is to provide a special reproduction system in a rotary recording medium reproducing apparatus by which system special modes of reproduction such as still reproduction, slow-motion and quick-motion reproduction in the forward direction, and normal-speed, slow-motion, and quick-motion reproduction in the backward direction can be carried out.

Still another object of the invention is to provide a special reproduction system in a rotary recording medium reproducing apparatus by which system the traversing across tracks of the reproducing transducer is carried out within the vertical blanking period of the video signal, and an excellent special picture can be reproduced.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 6 is a block diagram of one embodiment of a pulse generating circuit constituting an essential part of special reproduction system illustrated in FIG. 5;

FIGS. 7(A) through 7(F) are time charts indicating signal waveforms for a description of the operation of the shift register in the circuit shown in FIG. 6;

FIG. 8 is a circuit diagram of one embodiment of one of gate circuits in the pulse generating circuit shown in FIG. 6;

DETAILED DESCRIPTION

Figure 1:
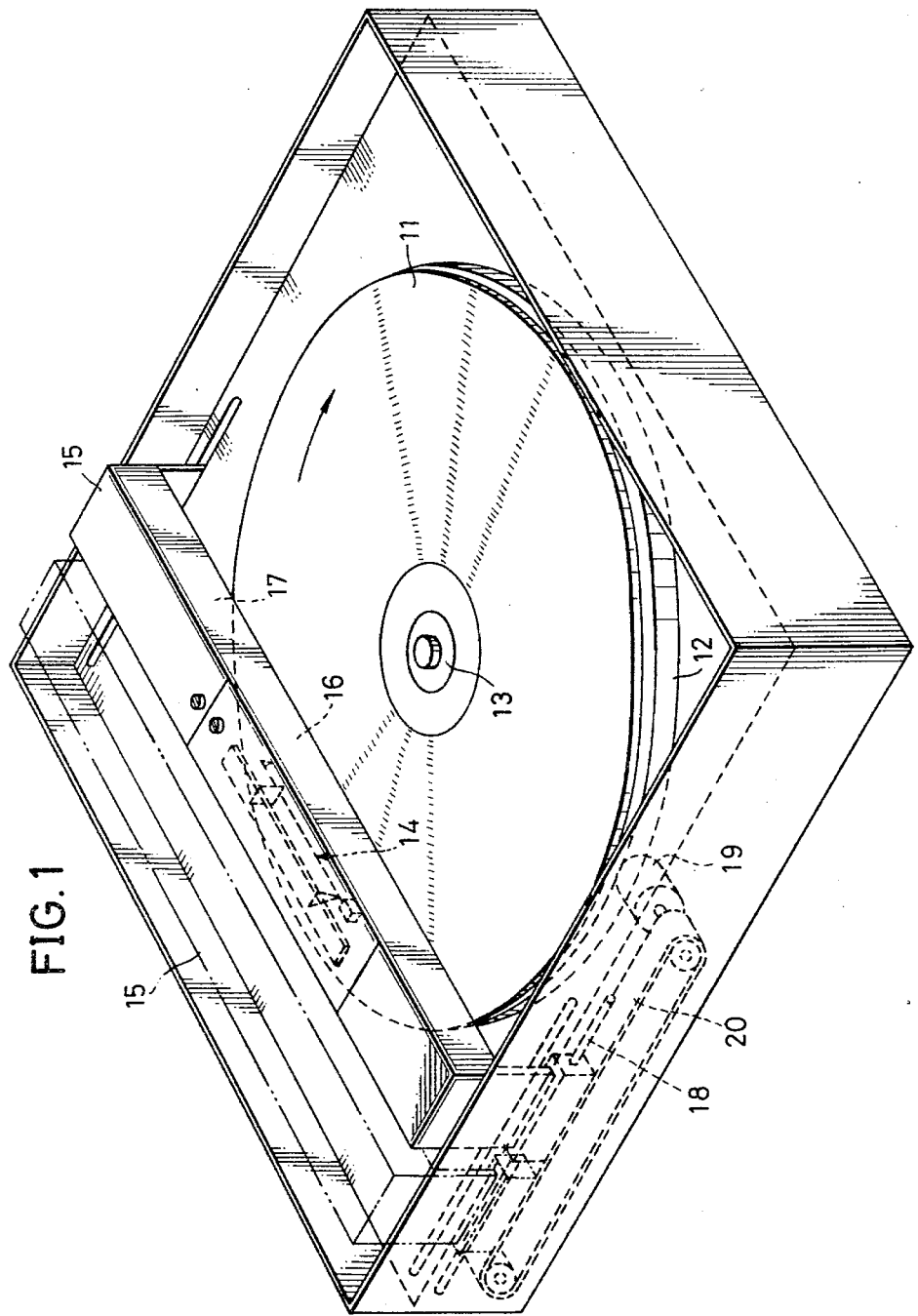
FIG. 1 is a perspective view of a rotary recording medium reproducing apparatus to which a reproducing transducer feeding device according to the present invention can be applied.

The general features of the exterior of a reproducing apparatus for reproducing a rotary recording medium, in which a special reproducing system according to the invention can be applied, is illustrated in FIG. 1. In this apparatus, a rotary disc 11 is a rotary recording medium having a video signal recorded. The disc 11 is set on and clamped to a turntable 12 by a clamper 13. The record disc is thus rotated unitarily with the turntable 12 at a rotational speed of 900 rpm, for example.

A signal pickup device 14, as a reproducing transducer, is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The carriage 15 is disposed horizontally above the turntable 12, and is guided at its ends by a pair of parallel horizontal guide bars 18 (only one shown). This carriage 15, driven by an endless belt 20 driven by a motor 19, moves continuously and linearly in a direction from outer peripheral part to inner peripheral part at a speed equal to the distance of one track pitch per revolution of the turntable 12, during a forward normal reproducing mode. Otherwise, the carriage may be driven by a feed screw driven by the motor 19. The carriage movement is in synchronism with the rotation of the turntable. As a result of this movement of the carrier 15, a stylus of the signal pickup device 14 travels radially across the disc 11 and traces the spiral track of the disc 11 during rotation.

A video signal is recorded with spiral track of pits formed on the disc 11 responsive to the information content of the signal. One part of this track is shown in an enlarged scale in FIG. 2. Track turns of the single continuous spiral track, corresponding to each revolution of the disc 11, are designated as $t_1, t_2, t_3 \ldots$. Each track turn is constituted by the formation of pits 26 of the main information signal along the plane track path and has no stylus guide groove formed. With respect to one track turn $t_1$, in every horizontal scanning period (H) at a position corresponding to the horizontal blanking period, pits 27 of the first reference signal fp1 are formed on one lateral side of the track as viewed in the track path direction. Pits 28 of the second reference signal fp2 are formed on the other side of the track.

In the middle position between the centerlines of adjacent track turns, only pits of either one kind of the pits 27 and 28 of the above mentioned reference signals fp1 and fp2 are formed, and with respect to one track, moreover, the sides on which the pits 27 and 28 are formed are alternated for every track turn. That is, if pits 27 and 28 are respectively formed on the right and left sides, for example, of one track turn, pits 28 and 27 will be respectively formed on the right and left sides of each of the adjacent track turns.

Figure 3:
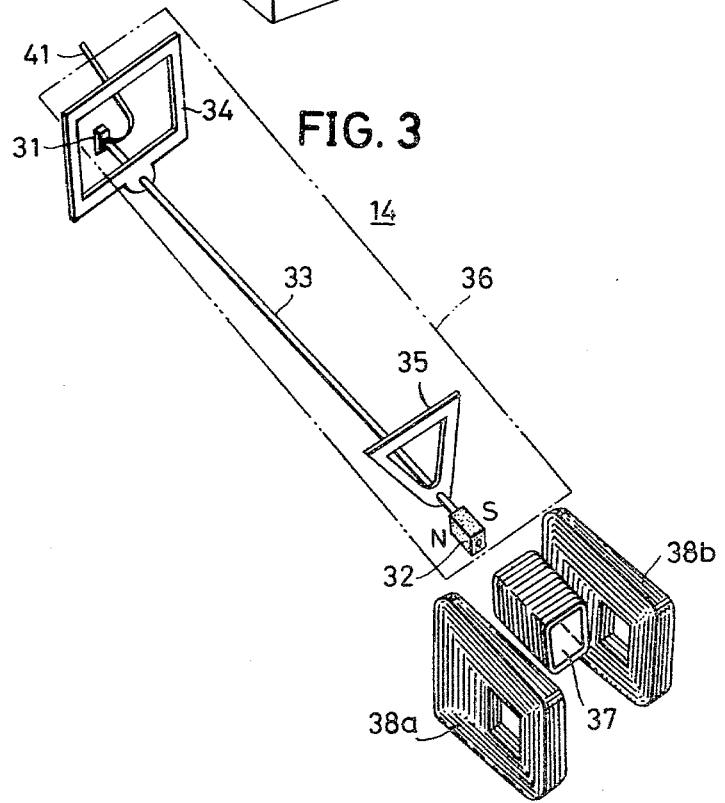
FIG. 3 is an exploded perspective view showing an example of a signal pickup device as a reproducing transducer in a reproducing apparatus indicated in FIG. 1.
Figure 4:
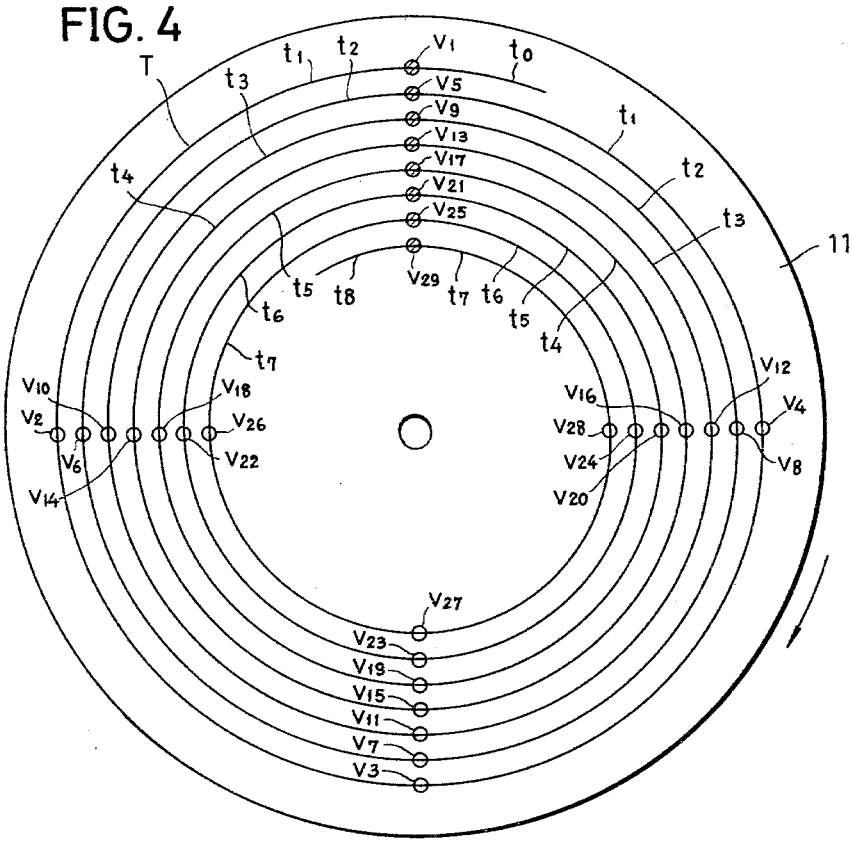
FIG. 4 is a diagrammatic plan view indicating vertical synchronizing signal positions on a track pattern of a rotary recording medium.

On the disc 11, as indicated in FIG. 4, a video signal is recorded along a spiral track T for two frames, that is, four fields, per revolution of the disc, for example. In FIG. 4, the tracks of the reference signals fp1 and fp2 are omitted. The positions of the vertical synchronizing signals of respective fields are designated by reference characters V1, V2, V3, ..., and the successive track parts corresponding to one revolution of the disc of a single spiral track will be respectively designated as track turns $t_1, t_2, t_3, \ldots$. Furthermore, a reference signal fp3 is recorded at the starting end positions V1, V5, V9, ... of the track turns $t_1, t_2, t_3, \ldots$ One example of the signal pickup device 14 indicated in FIG. 1 will now be described with reference to FIG. 3. This pickup device 14 has a relatively long cantilever arm 33 with a reproducing stylus 31 at its distal free end and a permanent magnet member 32 at its proximal root end. This cantilever arm 33 is supported near its free end by a damper 34 of a Rahmen or rigid frame structure (or rectangular shape). Arm 33 is held near its root part by a damper 35 having a truss structure (of triangular shape). Both of these dampers 34 and 35 are fixed to the lower surface of a substantially horizontal support plate 36. The damper 35 may be omitted.

The support plate 36 is fitted in and held by a holding structure. On the lower surface of plate 36 are fixed a coil 37 for tracking and a pair of coils 38a and 38b for jitter compensation. These coils 38a and 38b are disposed on opposite sides of the tracking coil 37. The above mentioned permanent magnet member 32 is fitted within the tracking coil 37 with gaps therebetween.

Figure 2:
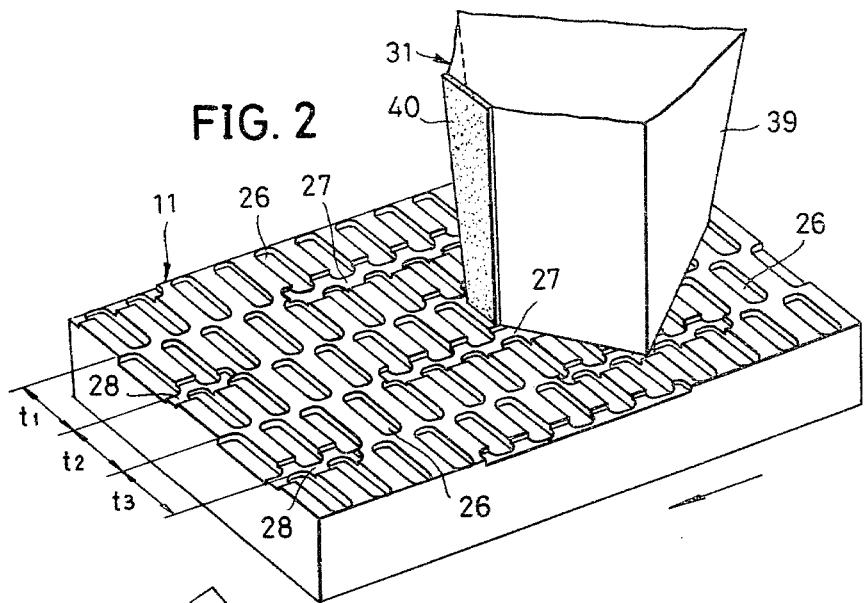
FIG. 2 is a perspective view, on a large scale, showing a part of a rotary recording medium together with a tip part of a reproducing stylus.

The reproducing stylus 31 has a tip thereof having a configuration as indicated in FIG. 2. The reproducing stylus 31 is constituted by a stylus structure 39 made of sapphire and having a disc tracing surface which has a width greater than a track width, and an electrode 40 fixed to the rear face of the stylus structure 39. The electrode 40 is connected with a metal ribbon 40, as indicated in FIG. 3. As the reproducing stylus 31 traces along a track on the disc 11 rotating in the direction indicated by arrow, the video signal recorded thereon by variation of pits is reproduced as variation in the electrostatic capacitance between the surface of the disc 11 and the electrode 40 of the reproducing stylus 31.

Figure 5:
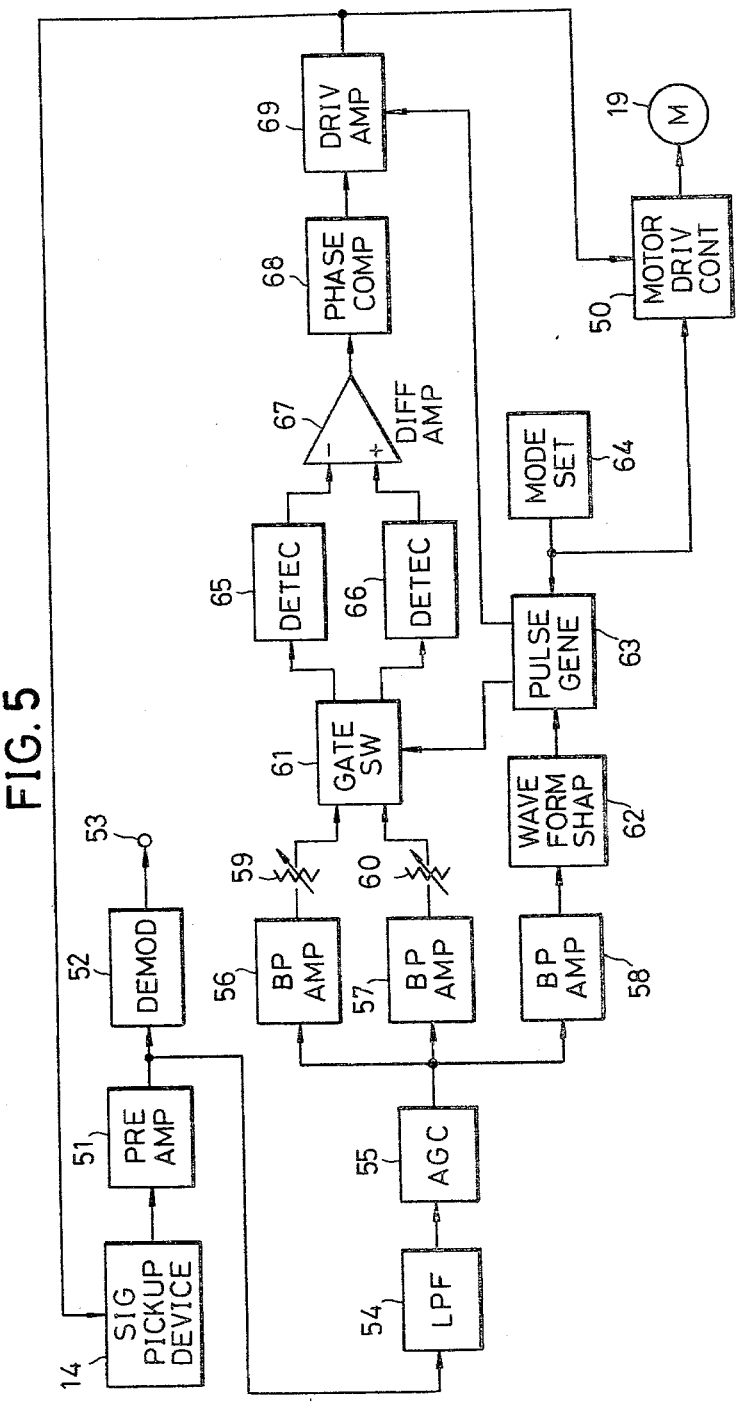
FIG. 5 is a block diagram of one embodiment of the special reproduction system according to the invention in a rotary recording medium reproducing apparatus.

In the system shown in FIG. 5, a reproduced signal picked up from the disc 11 as a minute variation of electrostatic capacitance by the reproducing stylus 31 of the signal pickup device 14 is supplied to a preamplifier 51 having a resonant circuit. The resonant frequency varies in response to this variation in electrostatic capacitance and is formed into a signal of a desired level. The resulting output of the preamplifier 51, is demodulated into the original video signal by a demodulator 52 and is sent out as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are supplied respectively to amplifiers 56, 57, and 58. Here, each of the amplifiers 56, 57, and 58 is a kind of band-pass amplifier. The amplifiers 56, 57, and 58 are respectively designed to have steep passing frequency characteristics at only the frequency fp1, fp2, and fp3. As a result, the signals of frequencies fp1 and fp2 are obtained separately from the amplifiers 56 and 57, respectively. These signals respectively pass through level adjustors 59 and 60, where their levels are adjusted. The resulting signals are then supplied to a gate switching circuit 61. These reproduced signals fp1 and fp2 are pulse trains of respectively having periods corresponding to 2H (2 horizontal scanning periods). Moreover, they have a coinciding phase in the horizontal blanking period of the reproduced video signal.

The signal fp3 separated and amplified in this bandpass amplifier 58 is supplied to a wave-form shaping circuit 62 comprising a schmitt circuit. There, its wave is shaped so that it is not affected by noise and other influences. The wave-shaped signal is then supplied to a pulse generating circuit 63. The resulting output switching pulses from this pulse generating circuit 63 are supplied to the gate switching circuit 61.

The gate switching circuit 61 switches the signals fp1 and fp2 every revolution period of the disc 11 in response to the supplied switching pulses. The disc rotational speed in the present embodiment of the invention is 900 rpm. as mentioned hereinbefore. Therefore, two frames of the video signal are recorded for each revolution of the disc 11. The switching pulse applied to the gate switching circuit 61 has inverting polarities which change every two frames (1/15 second). As a result, the gate switching circuit 61 supplies the signals fp1 and fp2 of respectively predetermined poralities to detecting circuits 65 and 66.

The detecting circuits 65 and 66 detect the envelopes of their respective input reference signals and convert the envelopes into DC voltages. These voltages are then supplied to a differential amplifier 67. This differential amplifier 67 compares the output signals of the two detecting circuit 65 and 66 which vary in response to the reproduced levels of the signals fp1 and fp2. This generates an output tracking error signal which indicates the tracking error direction and the error quantity. This error signal passes through a phase compensation circuit 68 and is further amplified to a specific level by a driving amplifier 69.

Then, the output signal of the driving amplifier 69 is applied to the tracking coil 37 of the signal pickup device 14 as a control signal thereby to control it. As a result, the permanent magnet 32 undergoes a displacement within the coil 37, and, in conformity with this, the cantilever 33 also undergoes a displacement, whereby the reproducing stylus 31 is tracking controlled so that the above mentioned tracking error signal becomes zero, that is, so that the stylus 31 traces correctly the track T of the disc 11. Furthermore, the output signal of the driving amplifier 69 is supplied also to the motor driving control circuit 50 and so controls the rotational driving of the motor, which moves the signal pickup device 14, that the tracking control is carried out with the cantilever of the signal pickup device 14 constantly in the state wherein it is in its neutral position.

The pulse generating circuit 63 operates in response to the reproducing mode set by a control part 64 for setting the reproducing mode to generate switching pulses and skip pulses, which are respectively supplied to the gate switching circuit 61 and the driving amplifier 69.

One embodiment of the pulse generating circuit 63 constituting an essential part of the circuit shown in FIG. 5 will now be described with reference to FIG. 6. A reference signal fp3 of a waveform as indicated in FIG. 7 (B) sent from the waveform shaping circuit 62 is introduced into this pulse generating circuit 63 through a terminal 71a and supplied as data to a 4-bit shift register 70, to which is also supplied, through a terminal 71b, a vertical synchronizing signal of a waveform as indicated in FIG. 7(A) as a clock. This 4-bit shift register 70 thereupon produces four kinds of output signals F1, F2, F3, and F4 as indicated in FIGS. 7(C), 7(D), 7(E), and 7(F), respectively, of timings which are mutually and successively staggered at every field period and supplies these output signals to a gate circuit 72.

This gate circuit 72 has terminals 73a through 73h to which are applied respective signals in accordance with the reproducing mode setting of the control part 64 for reproducing mode setting. To the terminals 73a through 73e are applied, respectively, signals due to settings of modes of reproducing at quintuple speed (5 times normal speed), quadruple speed, triple speed, double speed, and normal speed in the forward direction. To the terminals 73f through 73h are applied, respectively, signals due to settings of modes of reproducing at triple speed, double speed, and normal speed in the reverse or backward direction. The gate circuit 72 has output terminals 74a, 74b, and 74c through which are obtained, respectively, skip pulses for quick-motion reproduction in the forward direction and skip pulses for quick-motion in the backward direction and switching pulses existing with timings as described hereinafter. These output pulses are respectively supplied to a forward skip pulse forming circuit 79, a backward skip pulse forming circuit 80, and a T-type flip-flop 82.

The reference signal fp3 introduced through the terminal 71a is supplied also to a counter 75, which produces outputs frequency divided respectively into $\frac{1}{2}$, $\frac{1}{4}$, $\frac{1}{8}$, and 1/16. These outputs are supplied to a gate circuit 76. This gate circuit 76 has terminals 77a through 77g to which are applied signals respectively in accordance with the reproducing mode setting of the reproducing mode setting control part 64. A signal due to still reproducing mode setting is applied to the terminal 77a. Signals respectively due to settings for $\frac{1}{2}$, $\frac{1}{4}$, $\frac{1}{8}$, and 1/16 slow-motion reproduction in the forward direction are applied respectively to the terminals 77b, 77c, 77d, and 77e. Signals respectively due to settings for slow-motion reproduction in the forward and backward directions are applied respectively to the terminals 77f and 77g. The gate circuit 76 has output terminals 78a and 78b through which are obtained, respectively, backward direction skip pulses and switching pulses. The output pulses are fed respectively to the backward direction skip pulse forming circuit 80 and the flip-flop 82.

The signals thus fed to the forward and backward direction skip pulse forming circuits 79 and 80 are formed therein respectively into skip pulses of the forward and backward directions of specific waveforms, which are led out through an output terminal 81 and supplied to the driving amplifier 69. The output switching pulses of the flip-flop 82 are led out through an output terminal 83 and supplied to the gate switching circuit 61.

The gate circuit 72 has a circuit organization, for example, as shown in FIG. 8. At the time of quintuple-speed reproduction mode in the forward direction, a signal is applied to the terminal 73a as described hereinabove, whereupon signals of the timings of the signals F1 through F4 are produced as outputs respectively from AND gates 85a through 85d. Similarly, at the time of guadruple-speed reproduction mode in the forward direction, signals of the timings of the signals F1, F2, and F3 are produced as outputs respectively from AND gates 85e, 85f, and 85g. At the time of triple-speed reproduction mode in the forward direction, signals of the timings of the signals F1 and F3 are produced as outputs respectively from AND gates 85h and 85i. At the time of double-speed and normal-speed reproduction modes in the forward direction, signals of the timing of the signal F1 are produced as outputs respectively from AND gates 85j and 85k.

These output of the AND gates 85a through 85j are supplied through an OR gate and through the terminal 74a to the forward skip pulse forming circuit 79, where they are formed into forward-direction skip pulses. The outputs of the AND gates 85b, 85c, 85d, 85f, 85g, 85i, and 85k are supplied by way of an OR gate and through the terminal 74c to the flip-flop 82 to be rendered into switching pulses.

At the time of triple-speed reproduction mode in the backward direction, a signal is applied to the terminal 73f as described hereinabove, whereupon signals of the timings of the signals F1 through F4 are produced as outputs respectively from AND gates 85l through 85o. Similarly, at the time of double-speed reproduction mode in the backward direction, signals of timings of the signals F1, F2, and F3 are produced as outputs respectively from AND gates 85p, 85q, and 85r. At the time of normal-speed reproduction mode in the backward direction, signals of the timings of the signals F1 and F3 are produced as outputs respectively from AND gates 85s and 85t.

These outputs of the AND gates 85l through 85t are supplied by way of an OR gate and through the terminal 74b to the backward direction skip pulse forming circuit 80 to be formed into backward-direction skip pulses. The outputs of the AND gates 85m, 85n, 85o, 85q, 85r, and 85t are supplied by way of an OR gate and through the terminal 74c to the flip-flop 82 and therein rendered into switching pulses. The skip pulse forming circuit 79 and 80 and the flip-flop 82 respectively form skip pulses and switching pulses with timings of the rises of the signals F1 through F4.

When forward-direction or backward-direction skip pulses are applied via the driving amplifier 69 to the tracking coil 37 of the signal pickup device 14, the reproducing stylus 31 is forcibly caused to skip one track turn and shift to the adjacent track turn respectively in the radially inward direction or outward direction of the disc 11. The changeover polarity of the gate switching circuit 61 is inverted every time a switching pulse is applied thereto.

Accordingly, at the time of quintuple-speed reproduction mode in the forward direction, the reproducing stylus 31 shifts (i.e., skips) to the adjacent track turn on the inward side of the disc 11 successively at each of four positions per revolution of the disc, for example, the positions V1, V6, V11, V16, V21, V26, . . . and traces track turns to, $t_2$, $t_3$, $t_4$, $t_5$, $t_7$, . . . every field period to reproduce the recorded signals. Thus, reproduction of a picture moving at quintuple speed in the forward direction is accomplished. Similarly, at the time of quadruple-speed reproduction mode in the forward direction, the stylus 31 skips at three positions per revolution of the disc 11 as at positions V1, V6, V11, V17, V22, V23, . . . and traces track turns to, $t_2$, $t_3$, $t_4$, $t_4$, $t_6$, . . . every field period. At the time of triple-speed reproduction mode in the forward direction, the stylus 31 skips at two positions per revolution of the disc 11 as at positions V1, V7, V13, V19, . . . and traces track turns to, $t_2$, $t_2$, $t_3$, $t_3$, $t_5$, . . . every field period. At the time of double-speed reproduction mode in the forward direction, the stylus 31 skips one position per revolution as at positions V1, V9, V17, V25, . . . and traces track turns to, $t_2$, $t_2$, $t_2$, $t_2$, $t_4$, . . . every field period. At the time of normal-speed reproduction mode in the forward direction, the stylus 31 does not skip and traces the track turns to, $t_1$, $t_1$, $t_1$, $t_1$, $t_2$, . . .

At the time of quick-motion reproduction in the forward direction at double speed or higher speed, switching pulses are not applied to the gate switching circuit 61, and switching is not carried out at the time of skipping at positions V1, V5, V9, . . . of normal track transition. At the time of skipping at other positions V2, V3, and V4, V6, V7, and V8, . . . , switching pulses are applied to the gate switching circuit 61, and switching is carried out.

At the time of triple-speed reproduction mode in the backward direction, the reproducing stylus 31 shifts to the adjacent track turn on the disc outer side successively at four positions per revolution of the disc 11, for example, at positions V29, V26, V23, V20, V17, V14, . . . and reproduces signals by tracing track turns $t_8$, $t_7$, $t_6$, $t_5$, $t_4$, . . . every field period. By this operation, a reproduced picture moving at triple speed in the backward direction is obtained. Similarly, at the time of double-speed reproduction mode in the backward direction, the stylus 31 skips at three positions per disc revolution, for example, at positions V29, V26, V23, V21, V18, . . . and traces track turns $t_8$, $t_7$, $t_6$, $t_5$, $t_5$, . . . every field period, thus accomplishing double-speed reproduction in the backward direction. At the time of normal-speed reproduction mode in the backward direction, the stylus 31 skips at two positions per disc revolution, for example, at positions V29, V27, V25, V23, . . . and traces track turns $t_8$, $t_7$, $t_6$, $t_5$, . . . every two-field period.

In this connection, in the backward-direction reproduction mode of operation, switching pulses are not applied at the time of skipping at the track turn transition positions V29, V25, V21, . . . to the gate switching circuit 62, which therefore does not carry out switching. At other positions V26, V27, and V28, V22, V23, and V24, V18, V19, and V20, . . . , switching pulses are applied to the gate switching circuit 61, which thereupon carries out switching.

Figure 9:
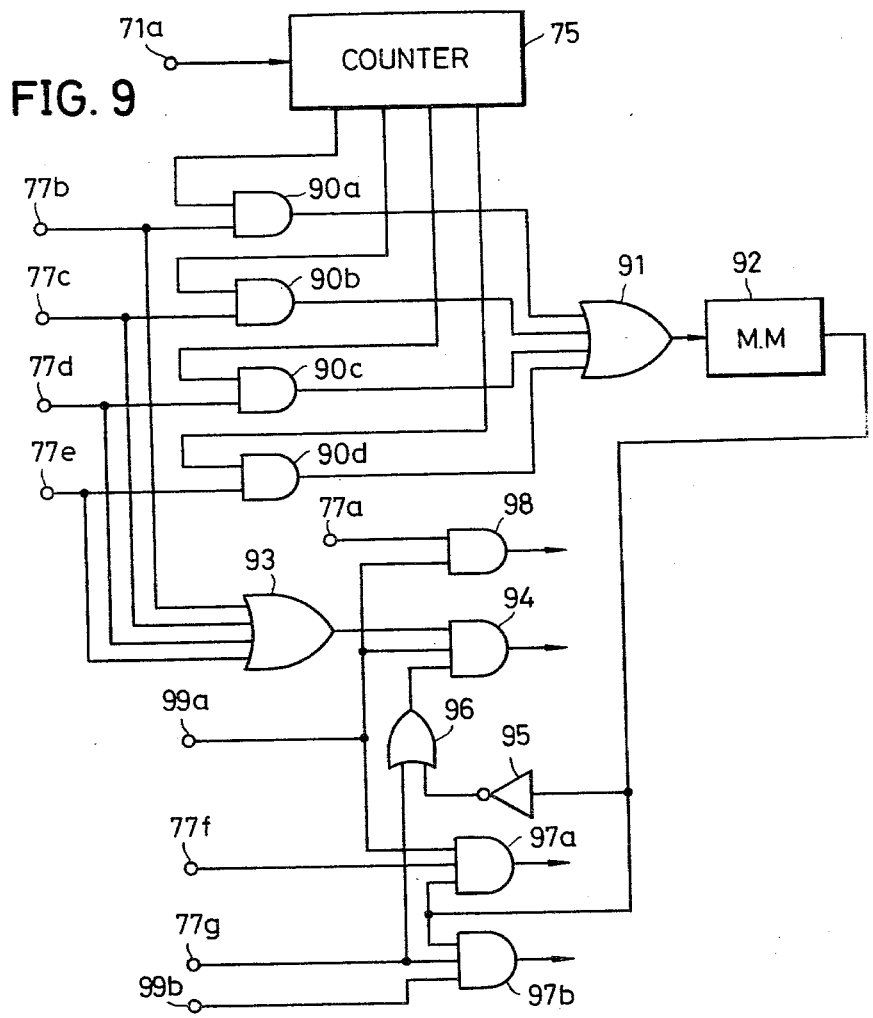
FIG. 9 is a circuit diagram of one embodiment of the other gate circuit in the pulse generating circuit shown in FIG. 6.

The gate circuit 76 has a circuit organization, for example, as indicated in FIG. 9. To AND gates 90a through 90d are supplied signals respectively from the terminals 77b through 77e, which signals are due to ½, ¼, ⅛, and 1/16 slow-motion reproduction mode setting, and signals resulting from ½, ¼, ⅛, and 1/16 frequency division of the signal fp3 by the counter 75. The outputs of the AND gates 90a through 90d are supplied by way of an OR gate 91 to a monostable multivibrator 92, which is thereupon triggered by the rising parts of these outputs and generates a pulse signal of a specific width (i.e., 2 through 4-field period, for example, a 3-filed period). The signals of the terminals 77b through 77e are supplied via an OR gate 93 to an AND gate 94.

In the case of forward ⅛ slow-motion reproduction mode, for example, the output of the AND gate 90c triggers the monostable multivibrator 92. The monostable multivibrator 92 thereupon produces a signal of a period which is 8 times the period of the signal fp3. This signal is supplied to AND gates 97a and 97b and, at the same time, is supplied through an inverter 95 and an OR gate 96 to the AND gate 94.

To the AND gate 94 are simultaneously supplied the signal from the terminal 77d and the signal fp3 from a terminal 99a. Accordingly, a signal of a timing in which the signal fp3 exists in the period wherein pulses from the monostable multivibrator 92 do not exist is obtained from this AND gate 94. This output of the AND gate 94 is supplied through the output terminal 78a to the backward skip pulse generating circuit 80.

Therefore, at the time of forward slow-motion reproduction, backward skip pulses are generated in a proportion of 7 pulses per 8 pulses of the signal fp3, that is, 7 revolutions per 8 revolutions of the disc 11, and still reproduction is carried out during 7 revolutions out of 8 revolutions of the disc 11. Furthermore, backward skip pulses are not generated in a proportion of 1 pulse per 8 pulses of the signal fp3, and the state becomes that of normal reproduction. Thus, forward $\frac{1}{8}$ slow-motion reproduction is carried out. Forward $\frac{1}{2}$, $\frac{1}{4}$, and 1/16 slow-motion reproduction are similarly accomplished.

As a result of setting of a forward slow-motion reproduction mode, a signal from the terminal 77f is fed to the AND gate 97a. In addition, the output of the monostable multivibrator 92 and the signal fp3 from the terminal 99a are supplied to the AND gate 97a. Accordingly, a signal is obtained from the AND gate 97a in response to the signal from the monostable multivibrator 92. The output of the AND gate 97a is supplied through the output terminal 78b to the flip-flop 82, where it is rendered into switching pulses.

Next, in the case of backward $\frac{1}{8}$ slow-motion reproduction, for example, a pulse signal of a specific width resulting from $\frac{1}{8}$ frequency division of the signal fp3 is obtained from the monostable multivibrator 92 similarly as in the case described above. In response to the setting of backward slow-motion reproduction mode, a signal is applied to the terminal 77g. This signal is thus applied via the OR gate 96 to the AND gate 94. Accordingly, a signal is obtained with the timing of the signal fp3 from the terminal 99a from the AND gate 94 irrespectively of the signal from the inverter 95. Therefore, backward skip pulses are formed every revolution of the disc 11, and the reproducing stylus is caused to skip radially outward relative to the disc.

From the terminal 99b, furthermore, vertical synchronizing signals reproduced at positions V3, V7, V11, ... on the diametrically opposite side of the disc 11 from the positions V1, V5, V9, ... at which the signal fp3 is recorded are supplied to the AND gate 97b. Accordingly, in the case of backward $\frac{1}{8}$ slow-motion reproduction, an output is obtained from the AND gate 97b in accordance with the timings of the vertical synchronizing signals reproduced at the above mentioned positions V3, V7, V11, ... in the proportion of once per 8 revolutions of the disc 11. This output of the AND gate 97b is supplied through the output terminals 78a and 78b to the backward skip pulse generating circuit 80 and the flip-flop 82.

Therefore, still reproduction is carried out during 7 revolutions out of 8 revolutions of the disc 11, and reproduction advances at normal speed in the backward direction during one revolution. Thus, backward $\frac{1}{8}$ slow-motion reproduction is accomplished.

At the time of still reproduction, a still reproduction mode signal applied to the terminal 77a and the signal fp3 applied to the terminal 99a are supplied to the AND gate 98. Therefore, at the time of still reproduction mode, a signal is obtained from only the AND gate 98 with a timing corresponding to the signal fp3. This output of the AND gate 98 is supplied to the backward skip pulse forming circuit 80.

Figure 10A:
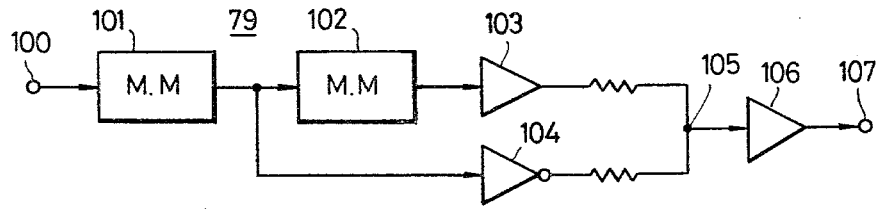
FIGS. 10A and 10B are circuit diagrams respectively showing embodiments of the skip pulse forming circuits in the circuit shown in FIG. 6.

The forward skip pulse forming circuit 79 has a circuit organization, for example, as shown in FIG. 10A. The signals from the output terminal 74a of the gate circuit 72 are applied to an input terminal 100 of this circuit 79 and trigger a monostable multivibrator 101. The falling edge of the waveform of the output signal of this monostable multivibrator 101 triggers a monostable multivibrator 102. The output of the monostable multivibrator 101 is inverted by an inverter 104. The output of the monostable multivibrator 102 is passed through an amplifier 103 and is added at a point 105 to the inverted signal from the inverter 104. The signal resulting from this addition is passed through an amplifier 106 and is led out through an output terminal 107 as forward skip pulses of a waveform as indicated in FIG. 11A.

Figure 10B:
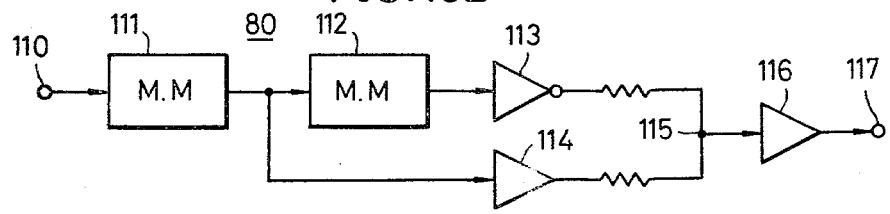

The backward skip pulse forming circuit 80 has a circuit organization, for example, as shown in FIG. 10B. The signals from the output terminals 74b and 78a of the gate circuits 72 and 76 are applied to an input terminal 110 of this circuit 80 and trigger a monostable multivibrator 111. The falling edge of the waveform of the output signal of this monostable multivibrator 111 trigger a monostable multivibrator 112. The output of the monostable multivibrator 112 is inverted by an inverter 113 and, at a point 115, is added to the output of monostable multivibrator 111 after it has passed through an amplifier 114. The signal resulting from this addition is passed through an amplifier 116 and is led out through an output terminal 117 as backward skip pulses of a waveform as indicated in FIG. 11B.

Figure 11A:
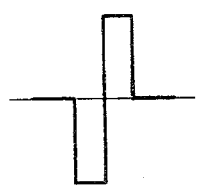
FIGS. 11A and 11B are time charts showing waveforms of skip pulses obtained from the circuits shown in FIGS. 10A and 10B, respectively.
Figure 11B:
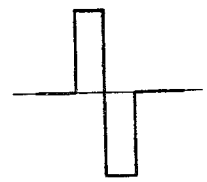

It should be noted that in both FIG. 11A and FIG. 11B the positive and negative pulses share a common edge so that one pulse follows immediately after the other.

The actuator (tracking control mechanism) for causing the reproducing stylus 31 of the signal pickup device 14 shown in FIG. 3 to undergo stepping motion is represented by a transfer function of secondary type comprising mass, compliance, and stiffness. The reproducing stylus can be caused to undergo stepping motion by this actuator by applying to the actuator pulses of a waveform which corresponds to the product of the reverse transfer function of the actuator and the step function. The pulses of this desirable waveform are the skip pulses of the waveforms indicated in FIGS. 11A and 11B obtained from the above described circuits shown in FIGS. 10A and 10B.

Further, this invention is not limited to these embodiments. Variations and modifications may be made without departing from the scope of the invention.

What is claimed is:

1. A reproducing system in an apparatus for reproducing a video signal from a rotary recording medium on which the video signal is recorded along a spiral track, each track turn of the spiral track containing a plurality of fields of the video signal, first and second reference signals being recorded on opposite sides of the track in such a manner that the sides on which the first and second reference signals are recorded are alternated for every track turn, a third reference signal being recorded at each position where said reference signals alternate in their position; said apparatus comprising reproducing element means for tracing over the spiral track on the rotary recording medium while picking up the video signal and the first, second and third reference signals, separating means for individually separating the first reference signal, the second reference signal and the third reference signal from the output signal of said reproducing element means, pulse generating means for generating a pulse signal in response to the separated third reference signal during normal reproduction, producing means responsive to every pulse signal and to the separated first and second reference signals for alternately producing a first signal corresponding to the level of the separated first reference signal minus the level of the separated second reference signal and a second corresponding to the level of the separated second reference signal minus the level of the separated first reference signal, and tracking control means for controlling the reproducing element means corresponding to the output signal of said producing means to trace along the spiral track;

said system comprising:
means in said pulse generating circuit for generating skip pulses with timing corresponding to the vertical blanking period positions of the recorded video signal during every rotational period of the rotary recording medium, the skip pulses having a number corresponding to an operational mode for carrying out a special reproduction which differs from the normal reproduction;

skipping means in said tracking control means operated in response to each of the skip pulses to cause the reproducing element means to shift to an adjacent track turn of the spiral track within the vertical blanking period of the recorded video signal; and means in said pulse generating circuit for generating switching pulses with the timing of each of the skip pulses which occur except for the timing of the separated third reference signal, and for stopping the pulse signal in response to the skip pulses which occur in accordance with the timing of the separated third reference signal during the special reproduction;

said producing means alternately producing the first signal and the second signal in response to every switching pulse.

2. A reproducing system as claimed in claim 1 in which the skip pulse generating means generates skip pulses having a waveform comprising a positive polarity pulse and a negative polarity pulse, the trailing edge of one of the pulses directly following the leading edge of the other polarity pulse.

3. A reproducing system as claimed in claim 1 in which the skip pulse generating means generates skip pulses in response to which the skipping means causes the reproducing element means to skip in the forward direction at least once per revolution of the rotary recording medium and to carry out forward quick-motion reproduction.

4. A reproducing system as claimed in claim 1 in which the skip pulse generating means generates skip pulses in response to which the skipping means causes the reproducing element means to skip in the forward direction every plural number of revolutions of the rotary recording medium and to carry out forward fast-motion reproduction.

5. A reproducing system as claimed in claim 1 in which the skip pulse generating means generates skip pulses in response to which the skipping means causes the reproducing element means to skip in the backward direction every revolution of the rotary recording medium and to carry out still reproduction.

6. A reproducing system as claimed in claim 1 in which the skip pulse generating means generates skip pulses in response to which the skipping means causes the reproducing element means to skip twice in the backward direction every revolution of the rotary recording medium and to carry out backward normal-speed reproduction.

7. A reproducing system as claimed in claim 1 in which the skip pulse generating means generates skip pulses in response to which the skipping means causes the reproducing element to skip N times (where N is an integer equal to or greater than 3) in the backward direction every revolution of the rotary recording medium and to carry out backward quick-motion reproduction.

8. A reproducing system as claimed in claim 1 in which the skip pulse generating means generates skip pulses in response to which the skipping means causes the reproducing element means to skip twice in the backward direction every R revolutions (where R is an integral plural number) of the rotary recording medium and to skip once in the backward direction every revolution other than R revolutions thereby to carry out backward slow-motion reproduction.

9. A reproducing system as claimed in claim 1 in which the skip pulse generating means generates skip pulses of waveforms which are the inverse polarity of each other for skipping the reproducing element means in the forward direction and during skipping thereof in the backward direction.

* * * * *